United States Patent [19]

de Wilde et al.

[11] Patent Number: 4,849,108
[45] Date of Patent: Jul. 18, 1989

[54] PROCESS FOR PURIFYING WASTE WATER

[75] Inventors: Etienne F. de Wilde, Rekem, Belgium; Hubertus W. Broens, Buchten, Netherlands

[73] Assignee: KNP Papier B.V., Maastricht, Netherlands

[21] Appl. No.: 118,310

[22] Filed: Nov. 6, 1987

[51] Int. Cl.⁴ .............................................. C02F 3/28
[52] U.S. Cl. ..................... 210/603; 210/614; 210/624; 210/630; 210/928; 210/605; 435/167; 48/197 A
[58] Field of Search ............... 210/603, 605, 614, 612, 210/624, 630, 928; 435/167, 801; 48/197 A

[56] References Cited

U.S. PATENT DOCUMENTS

| | | | |
|---|---|---|---|
| 4,318,993 | 3/1982 | Ghosh et al. | 210/631 |
| 4,384,956 | 5/1983 | Mulder | 210/603 |
| 4,510,243 | 4/1985 | Haga et al. | 210/605 |
| 4,597,872 | 7/1986 | Andersson et al. | 210/603 |
| 4,614,588 | 9/1986 | Li | 210/603 |
| 4,652,374 | 3/1987 | Cohen | 210/603 |
| 4,659,471 | 4/1987 | Molin et al. | 210/603 |

*Primary Examiner*—Benoit Castel
*Attorney, Agent, or Firm*—Cooper & Dunham

[57] ABSTRACT

A process for purifying waste water resulting from the manufacture of chemo- and/or thermomechanical pulp, which comprises subjecting the waste water to at least the following sequence of steps:

sedimentation of coarser constituents (4);
cooling (6);
detoxification (7);
anaerobic hydrolysis and preacidification (10) with addition of nutrient salts and readjustment of the redox potential;
production of methane in a methane reactor (11);
aerobic purification and separation of biologic sludge (12; 13), which is at least partly recycled to the detoxification step (7), in which process aerobic sludge is separated prior to the anaerobic hydrolysis step (10).

4 Claims, 1 Drawing Sheet

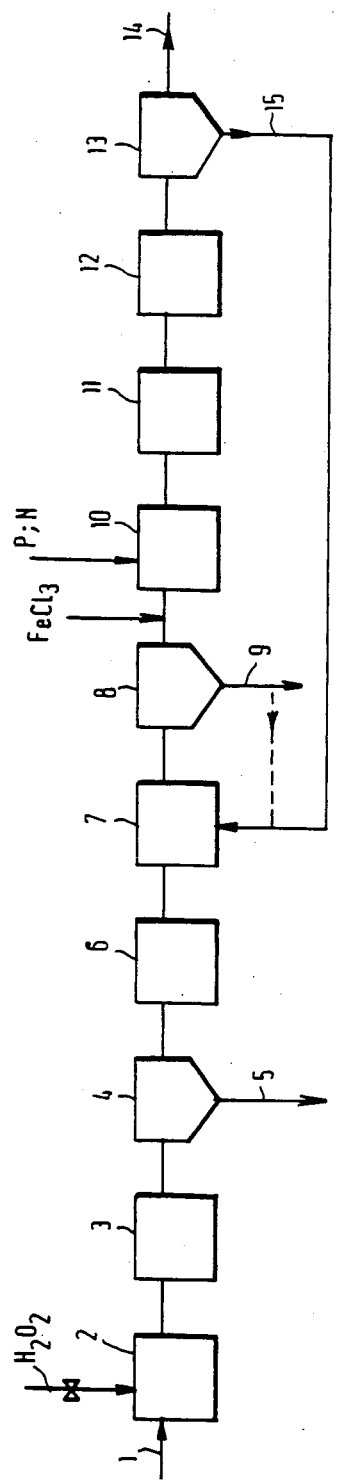

PROCESS FOR PURIFYING WASTE WATER

BACKGROUND OF THE INVENTION

This invention relates to a process for purifying waste water resulting from the manufacture of chemo- and/or thermomechanical pulp, which comprises subjecting said waste water to at least the following sequence of steps:
- sedimentation of coarser constituents;
- cooling;
- detoxification;
- anaerobic hydrolysis and preacidification with addition of nutrient salts and readjustment of the redox potential;
- production of methane in a methane reactor;
- aerobic purification and separation of biological sludge, which is at least partly recycled to the detoxification step.

Such a process is disclosed in European patent application No. 0133846. The known process is destined for waste water resulting from the manufacture of thermomechanical pulp (TMP) or chemomechanical pulp (CMP).

In the known process the hydrolysis step is followed by sedimentation of sludge, which is partly recycled to the hydrolysis step, while the excess of sludge is supplied to the methane reactor. After the methane reactor sedimentation of sludge is effected again, which sludge is partly recycled to the methane reactor, while the excess is discharged. This process has the drawback that the excess of sludge discharged after the hydrolysis reactor, which excess may be considerable, is anaerobic and cannot easily be processed further; moreover, the sludge has an unpleasant smell, which is detrimental to the environment.

It is a further drawback of discharging considerable amounts of sludge after the hydrolysis reactor that said sludge also contains the nutrient salts which are supplied in the hydrolysis step in order to optimize the hydrolysis process and the methane digestion. It is of course advisable that said nutrient salts should as much as possible be utilized in the purifying process and should as less as possible be discharged together with sludge.

SUMMARY OF THE INVENTION

The object of this invention is to improve the known process, for which purpose sedimentation of sludge takes place before the hydrolysis and methane-forming steps. This has the advantage that the sludge settled is aerobic and can be processed further in the known manner after it has been thickened. Besides, the nutrient salts supplied to the hydrolysis step are supplied to water having a lower sludge content, so that the amount of nutrient salts may be smaller, while these are also nearly completely preserved for the purifying process.

It is an object of the invention to improve the known process in some further points too. It has turned out that the waste water contains either an excess of $H_2O_2$ or an excess of $Na_2SO_3$. Both constituents are undesirable, because both $H_2O_2$ and $Na_2SO_3$ are toxic to the bacteria in the methane reactor.

According to the invention it is therefore determined preferably as early as possible in the purifying process whether there is an excess of either $H_2O_2$ or $Na_2SO_3$, after which in the former case $H_2O_2$ is neutralized in the known manner by adding biological sludge to the waste water, and in the second case additional $H_2O_2$ is supplied in order to convert sulfite into sulfate. This process, in which either the effect of $H_2O_2$ or that of $Na_2SO_3$ is suppressed, is fully automatic through the measurement of the redox potential and the pH of the waste water.

It is a further object of the invention to render sulfite or sulfate that might still be present in the waste water innocuous to the bacteria in the methane reactor. To achieve this, $FeCl_3$ is preferably supplied in a step preceding the methane reactor, said $FeCl_3$ being capable of neutralizing $H_2S$ formed from the sulfite or sulfate in the hydrolysis step and in the methane reactor by forming FeS which precipitates and is nontoxic to the methane bacteria.

The waste water from a CTMP process (CTMP=chemothermomechanical pulp) thus pretreated according to the invention surprisingly proves to form in the methane reactor a granular sludge having superior settling properties. Consequently, a known per se methane reactor of the Upflow Anaerobic Sludge Blanket (UASB) type can be advantageously utilized. Due to the superior settling properties of the sludge in conjunction with the selection of the UASB reactor a space load of 15–20 kg $COD/m^3$/a day can be realized with the process according to the invention, which space load is 4 kg $COD/m^3$/a day in a conventional methane reactor (COD=Chemical Oxygen Demand). The use of a methane reactor of the UASB type is known per se in a process for purifying waste water from a paper mill. However, this is concerned with paper making in which the starting material is either waste paper or market pulp. The waste water resulting from such a paper making process is much less polluted than the waste water formed in the manufacture of chemothermomechanical pulp for paper making. This waste water contains all the constituents that are also contained in the wood from which the pulp is made, as well as the constituents added during the manufacture of the pulp. Consequently, the waste water is highly polluted, and it is only by means of the process according to the invention that an adequate purification using an UASB reactor is possible.

In a reactor of the UASB type the waste water is introduced at the bottom of the reactor and then passes through a sludge cover in which the decomposed impurities in the waste water are converted to 95–90% into gases, chiefly methane, and to 5–10% into sludge. The sludge, the purified water and the gas are separated at the top of the reactor, and the sludge sinks back to the sludge cover present at the bottom of the reactor in order to participate in the purifying process.

BRIEF DESCRIPTION OF THE DRAWINGS

The FIGURE schematically shows a waste water purification plant with which the process according to the invention can be carried out.

DESCRIPTION OF THE PREFERRED EMBODIMENT

The waste water to be purified is passed via a line 1 to a first tank 2, in which the pH and the redox potential of the water is continuously measured in order to determine whether the water contains either an excess of $H_2O_2$ or an excess of $Na_2SO_3$. Depending on the measured values, $H_2O_2$ is suppled for neutralizing an excess of $Na_2SO_3$. If, however, an excess of $H_2O_2$ is present, this excess is neutralized at a later stage by means of biological sludge. The measurement and the required dosage of chemicals are continuous and fully automatic.

The waste water is passed from tank 2 to a tank 3, in which there is effected flocculation of the suspended materials contained in the waste water and of components, such as resinic acids, which are toxic to anaerobic bacteria. This flocculation can be effected in a manner known per se by supplying alum, calcium hydroxide and polyelectrolyte. In tank 3 also the pH value of the waste water can be adapted to a value favourable for the rest of the purifying process by supplying either caustic or acid.

The waste water is passed from tank 3 to a first settling tank 4, in which coarser constituents can settle from the waste water and can be discharged via a line 5.

The waste water is passed from settling tank 4 via a heat exchanger 6 in order to reduce its temperature to a temperature at which the conversion of organic impurities into methane in the methane reactor is optimal. As is known to those skilled in the art, this temperature depends on the employed type of methane bacteria.

Via heat exchanger 6 the waste water is passed to a pretreatment tank 7, in which the further detoxification of the waste water is effected by recycling biological sludge formed at the end of the purifying process via a line 15 to tank 7, which sludge is capable of neutralizing $H_2O_2$.

From tank 7 the waste water is passed to a second settling tank 8, in which the impurities contained in the waste water can settle and can be discharged via a line 9 as aerobic sludge, e.g., to a thickener, after which it is discharged in the known manner. A part of the sludge settled in settling tank 8 can be recycled to tank 7, as indicated by a dotted line. Consequently, the biological sludge supplied via line 15 can be optimally utilized, especially when large amounts of $H_2O_2$ are supplied with the waste water from the heat exchanger.

After the sludge separation in tank 8 the waste water is passed to a reactor 10, in which hydrolysis and preacidification of the waste water are effected. Nutrient salts containing phosphorus and nitrogen are added for this reactor. In reactor 10 high-molecular compounds in the waste water are hydrolyzed by means of bacteria and converted into acetic acid, which can be decomposed by methane bacteria in the methane reactor. Moreover, in reactor 10 the hydrolysis through sulfur-reducing bacteria causes sulfate/sulfite to convert into sulfide and sulfur. Finally, the redox potential is reduced to the level required for the action of the methane bacteria.

Preferably, $FeCl_3$ is added for reactor 10, which $FeCl_3$ is capable of neutralizing $H_2S$ by forming FeS, which $H_2S$ is formed in the hydrolysis mixing vessel and in the methane reactor from the sulfate and sulfite residues in the waste water.

The waste water, which now has optimum properties for allowing the methane bacteria to act is passed from reactor 10 to a methane reactor 11, preferably of the above UASB type.

The highly purified waste water is passed from the methane reactor 11 to a conventional aerobic purifying stage designated in the figure by step 12 and settling tank 13. The aerobically purified water is discharged via a line 14 to, e.g., the surface water, and the biological sludge settled is recycled to tank 7 via line 15.

EXAMPLE

The waste water purified in the anaerobic phase by the process according to the invention using the above plant, i.e. the water resulting from the methane reactor 11, had a COD (Chemical Oxygen Demand) of 40% of the COD value of the waste water supplied via line 1. Of the 60% removed by purification 10% was removed via sedimentation and 50% was converted in the methane reactor.

We claim:

1. In a process for purifying waste water resulting from the manufacture of chemical or thermomechanical pulp which comprises subjecting the waste water to the following sequence of operations:
    sedimentation for removal of coarser constituents therefrom;
    cooling the resulting waste water;
    subjecting the resulting cooled waste water to aerobic detoxification;
    carrying out anaerobic hydrolysis and preacidification with the addition of nutrient salts and adjustment of the redox potential;
    methane fermentation for production of methane in a fermenter;
    aerobic purificiation and separation of resulting biological aerobic sludge;
    the improvement which comprises separating aerobic sludge prior to said anaerobic hydrolysis.

2. A process in accordance with claim 1 wherein said waste water contains an excess of $H_2O_2$ or an excess of $Na_2SO_3$ and wherein $H_2O_2$ is added to reduce the excess $Na_2SO_3$ and wherein biological sludge is added to reduce excess $H_2O_2$.

3. A process in accordance with claim 1 wherein $FeCl_3$ is added to the waste water before anaerobic hydrolysis.

4. A process in accordance with claim 1 wherein the methane fermenter is of the upflow anaerobic sludge blanket type.

* * * * *